(12) United States Patent
Gunston

(10) Patent No.: US 7,080,728 B2
(45) Date of Patent: Jul. 25, 2006

(54) FORGED CHAIN AND FLIGHT ASSEMBLY AND METHOD OF MAKING SAME

(75) Inventor: Aden Michael Gunston, Dursley (GB)

(73) Assignee: 4B Elevator Components, Ltd., East Peoria, IL (US)

( * ) Notice: Subject to any disclaimer, the term of this patent is extended or adjusted under 35 U.S.C. 154(b) by 0 days.

(21) Appl. No.: 10/938,916

(22) Filed: Sep. 11, 2004

(65) Prior Publication Data

US 2006/0054464 A1   Mar. 16, 2006

(51) Int. Cl.
*B65G 19/24* (2006.01)

(52) U.S. Cl. ..................................... 198/731
(58) Field of Classification Search ............... 198/731, 198/734, 850–852
See application file for complete search history.

(56) References Cited

U.S. PATENT DOCUMENTS

| | | | | |
|---|---|---|---|---|
| 2,761,548 A | * | 9/1956 | Long | 198/733 |
| 3,103,275 A | * | 9/1963 | Rollins | 198/733 |
| 3,171,533 A | * | 3/1965 | Ferg | 198/731 |
| 3,225,897 A | * | 12/1965 | Rollins | 198/734 |
| 4,756,404 A | * | 7/1988 | Maag et al. | 198/731 |

* cited by examiner

*Primary Examiner*—Douglas Hess
(74) *Attorney, Agent, or Firm*—Kajane McManus

(57) ABSTRACT

The forged chain link and flight assembly and method of making same provide for use of a hollow sleeve for engaging link ends together and engaging flights to the link through engagement of a suitable connector through the flights and the sleeve to make the flights easily replaceable. As an alternative embodiment a solid sleeve incorporating threaded ends is also proposed for use in engaging flights to a forged chain link.

13 Claims, 12 Drawing Sheets

FIG. 3
PRIOR ART
FIG. 4
PRIOR ART
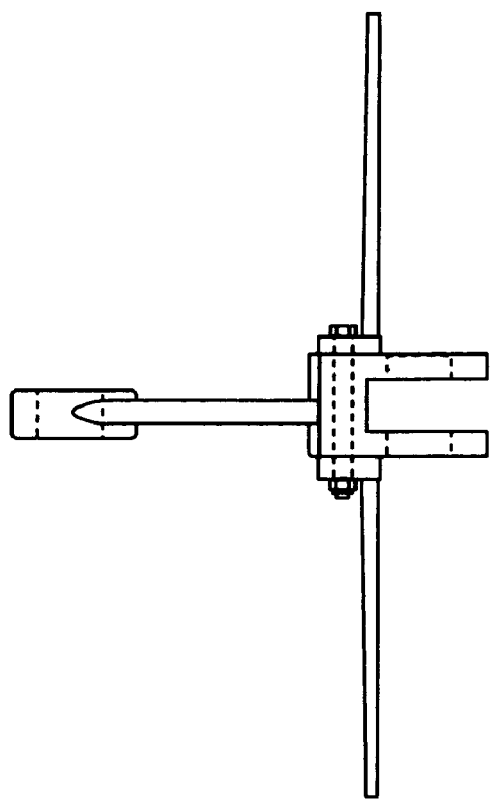
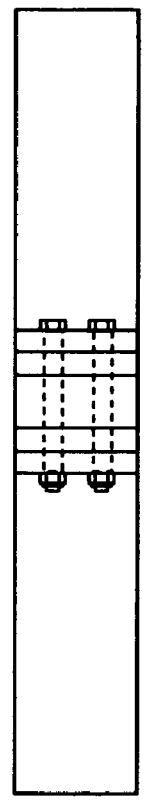
FIG. 5
PRIOR ART

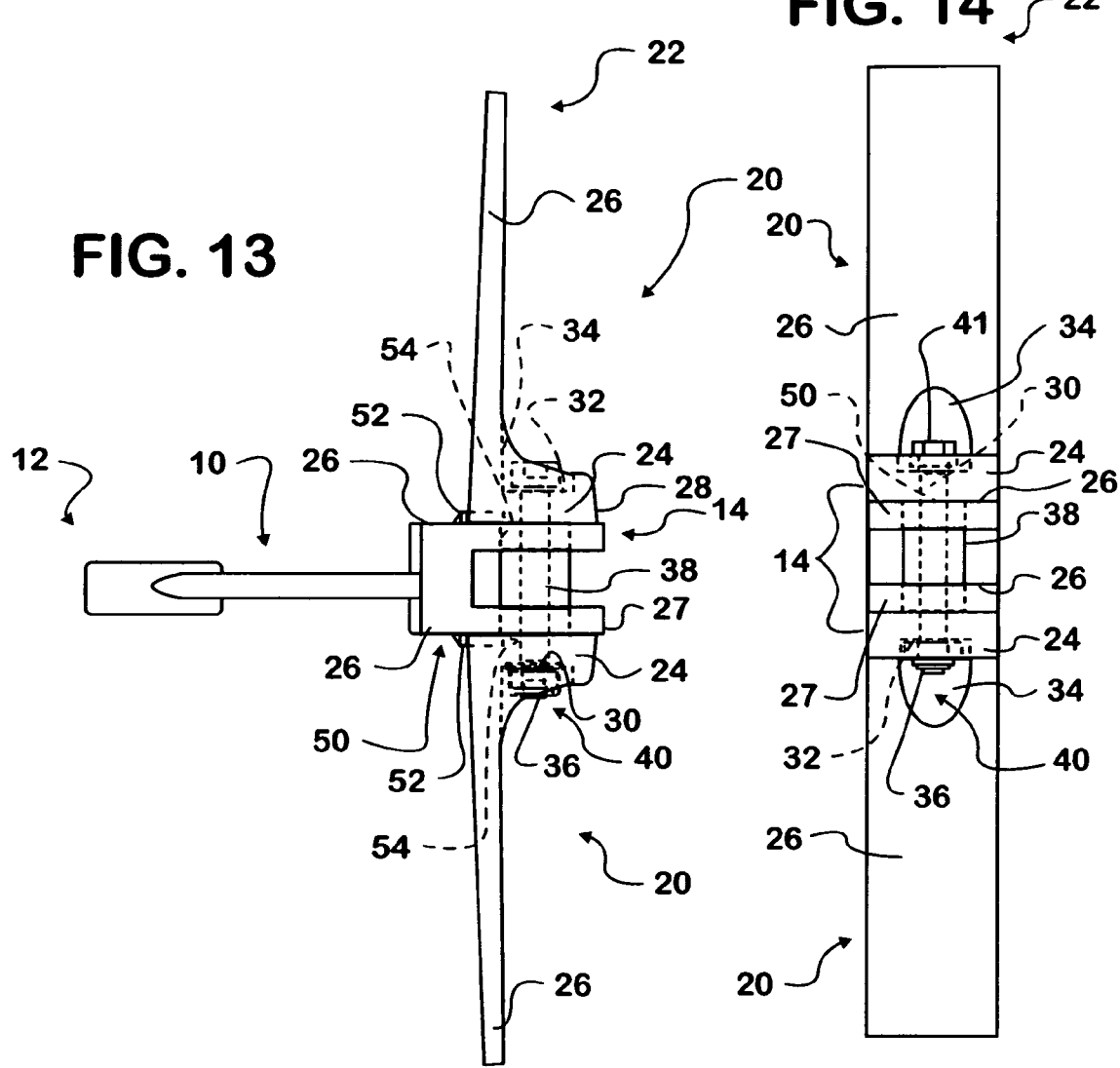
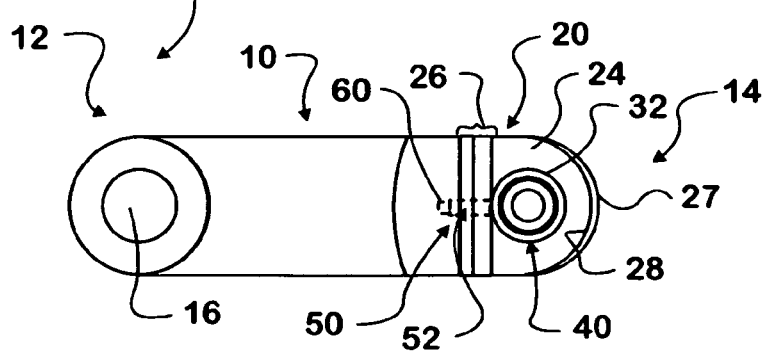
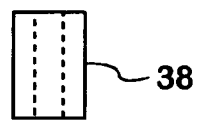

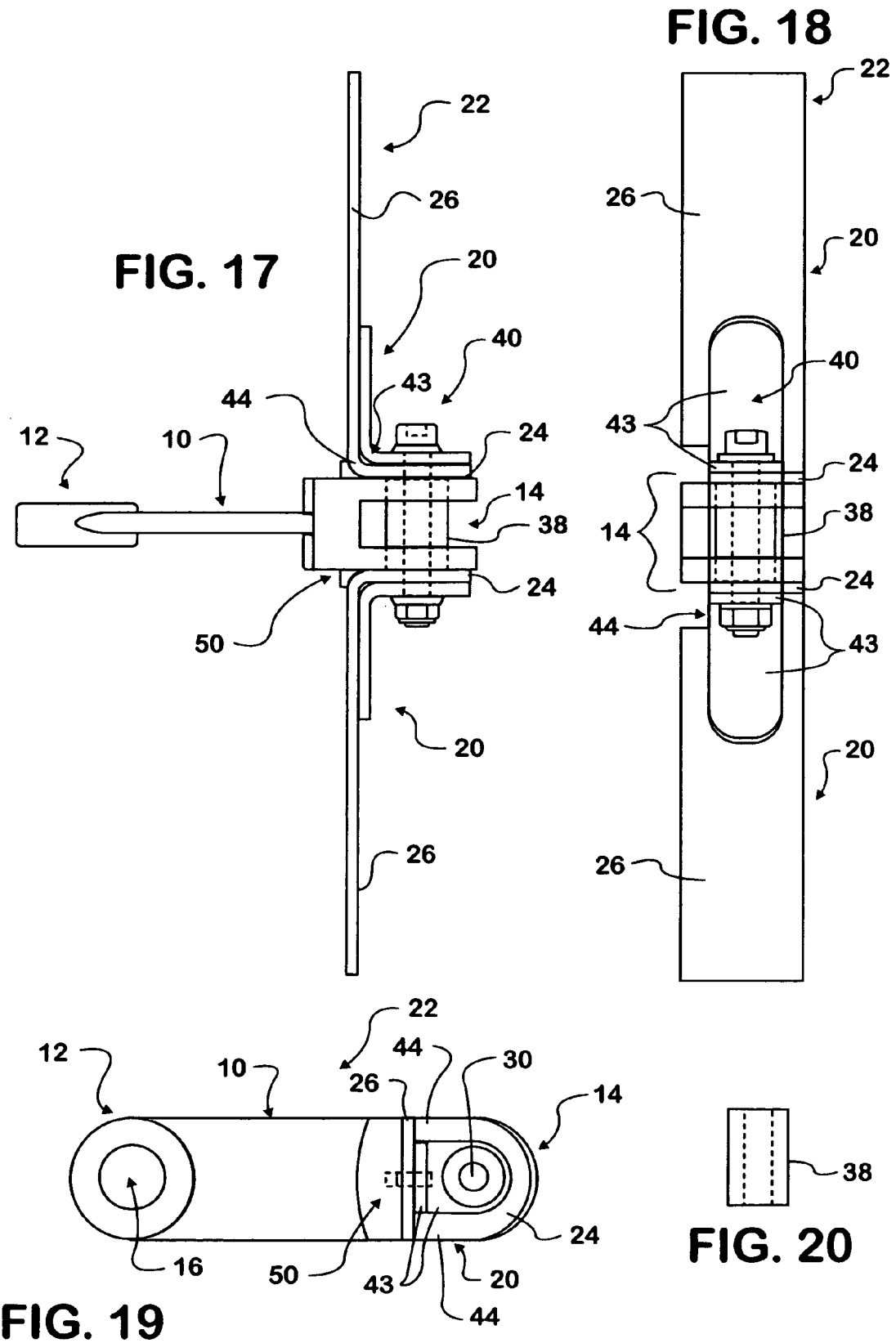

FORGED CHAIN AND FLIGHT ASSEMBLY AND METHOD OF MAKING SAME

BACKGROUND OF THE INVENTION

The present invention relates to a forged chain link and flight assembly and method of making same. More particularly, an assembly and method for attaching a flight to a female end of a forged chain link are taught which requires no welding on of the flight and which maintains integrity of the links of the chain of the assembly.

PRIOR ART

Heretofore, forged conveying chain was developed in the 1950's to provide a high strength to weight ratio chain for use in conveyors and chain elevators. The links are forged from high strength alloy case hardening steel and then machined to provide an accurately pitched chain.

The links are joined using solid connecting pins manufactured from similar material to the links and are also case hardened.

To act as a conveying chain it is necessary to attach flights to the links and in virtually every case this is done by welding steel bar to the side of the links.

Because of market demand, the costs incurred in attaching the flights must be kept to an absolute minimum with respect to weld preparation.

This results in welds which are adequate for normal operation but can fail in extreme conditions, such as upon the introduction of tramp into the machine or, indeed, a fatigue failure of one or more welds. There have been many such incidents and the welds are always condemned by welding experts because of welding directly to the case hardened surface and generally inadequate preparation of the flight bars. Integrity of the weld can also not be established.

It has also been proposed to weld threaded studs to the inner portion of the female end for fixation of flights thereover but, again, integrity of these welds also cannot be established.

The relatively high and increasing cost of welding also leads one to the conclusion that an alternative to welding would provide substantial cost savings and substantially improved reliability.

SUMMARY OF THE INVENTION

The chain link and flight assembly of the present invention and method of producing same offer a number of advantages, some of which are enumerated hereinbelow.

The requirement to produce structural quality welds directly to the links is eliminated, thus removing the uncertainty of weld integrity.

The cost of welding flights to links is eliminated.

The flights can be prefabricated using optimum manufacturing procedures and minimum cost.

Flights can be reinforced to minimize weight.

The links and flights can be shipped loose, making for much more efficient transport.

In the event of severe flight damage (tramp entering a conveyor) the damaged flights can easily be replaced. With welded flights it is either necessary to try to bend them straight or cut off the flights and to reweld. Either way the chain is usually left in a structurally comprised condition.

The cost of the hollow pins and fasteners proposed for use herein is comparable to the double circlip and pin arrangement and is less than the headed types.

Failure of circlips is not unknown and can cause serious damage when the connecting pin comes out. The method of the present invention would virtually eliminate this mode of failure.

Because the solid connecting pins used in the vast majority of conveyors are substantially stronger than necessary it has been concluded that they can be replaced by a hollow sleeve with a thinner connector extending therethrough, which can be used to engage a flight to a forged chain link without prejudicing the strength of the chain. This means that the flights, sleeves and connectors can be prefabricated and easily engaged, without welding of the flights to the links during installation of the chain.

Forged conveyor chains presently in use can also be retrofit with the link and flight assembly of the present invention using the method disclosed hereinbelow. Also, flights, damaged or otherwise, can be installed and reinstalled with the links maintained connected such that no disassembly or reassembly of the chain would be required using the method herein disclosed.

BRIEF DESCRIPTION OF THE DRAWINGS

FIGS. 3–5 disclose various views of a prior art embodiment of a forged chain link and plastic flight assembly.

FIG. 13 shows a top plan view of the assembly of the present invention made in accordance with the method of the present invention, this assembly incorporating a plastic flight.

FIG. 14 shows a female end view of the assembly of FIG. 13.

FIG. 15 shows a side view of the assembly of FIG. 13.

FIG. 16 is a perspective view of a hollow sleeve of the assembly.

FIGS. 17–20 correspond to FIGS. 13–16 showing the assembly of the present invention made in accordance with the method of the present invention, this assembly however, incorporating a metal flight.

DESCRIPTION OF THE PREFERRED EMBODIMENTS

Figure 1:
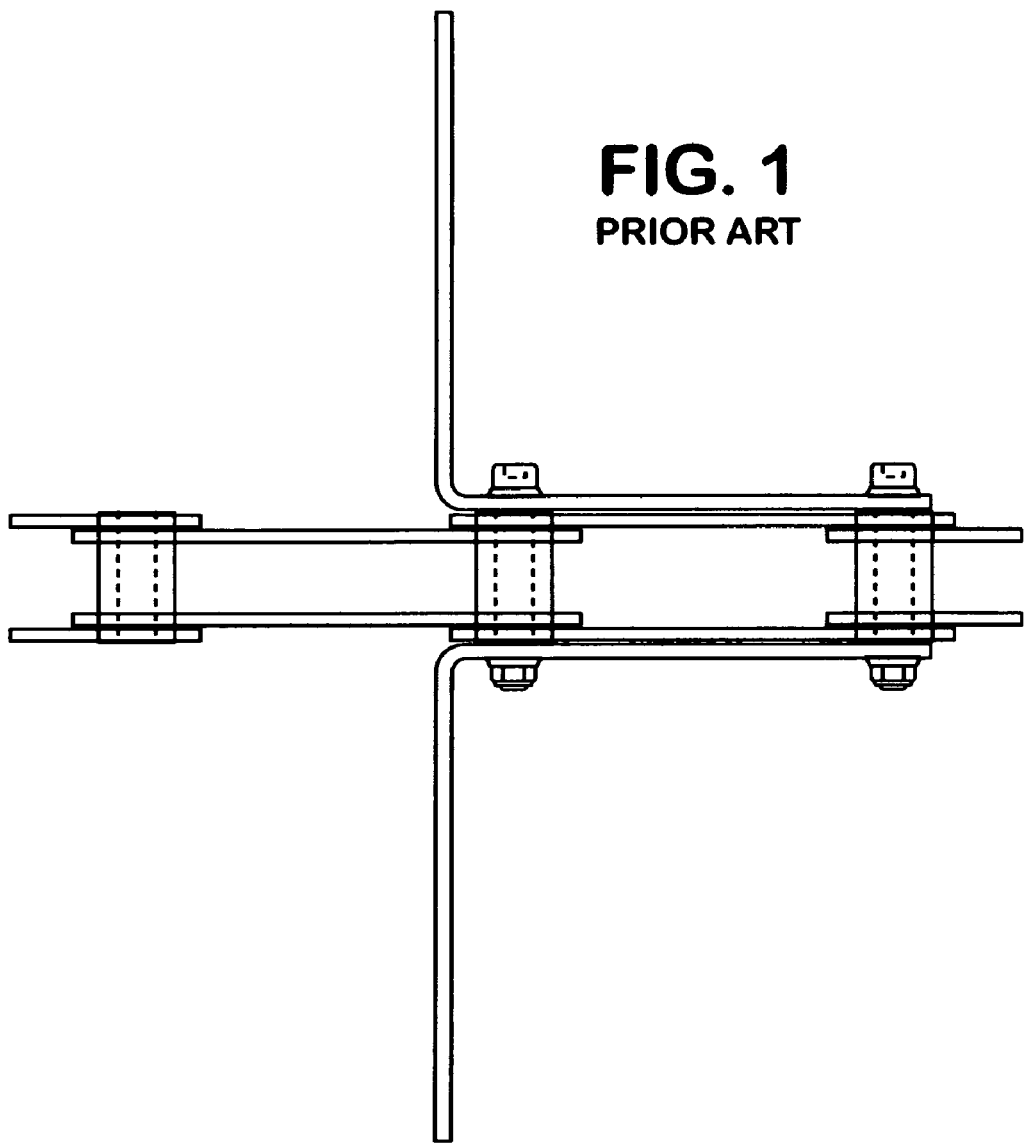
FIGS. 1 and 2 disclose various views of a prior art embodiment of a roller link chain and flight assembly.
Figure 2:
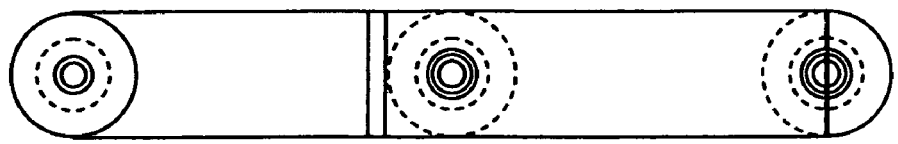

Referring now to the drawings in greater detail, FIGS. 1 and 2 show different views of a prior art plate link chain incorporating a flight engaged across the entire length of a plate link. Such engagement cannot be used with a forged chain link because the links must be able to pivot relative to one another.

FIGS. 3–5 show various views of a prior art forged chain link incorporating a plastic flight which is engaged to an inner end edge of a female end of the link by connectors which pass through the body of the link. Drilling, and/or threading, of extra holes into the body of the link compromises structural integrity thereof.

Figure 6:
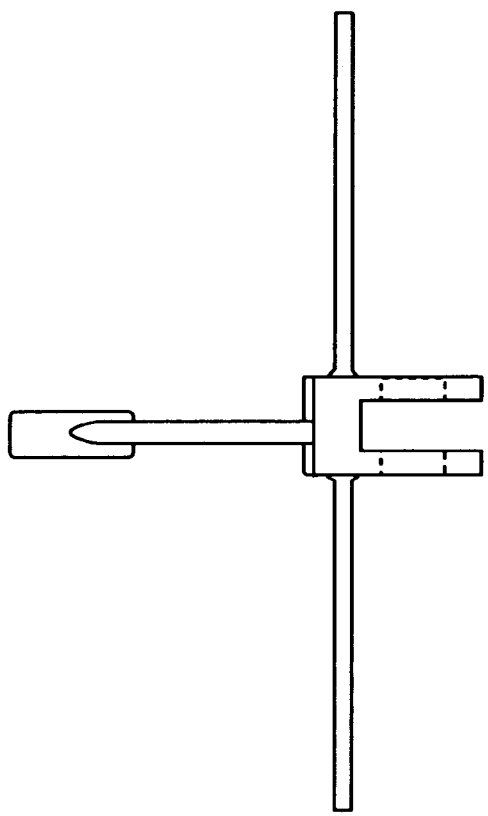
FIGS. 6–8 disclose various views of a prior art embodiment of a forged chain link and a metal flight assembly.
Figure 7:
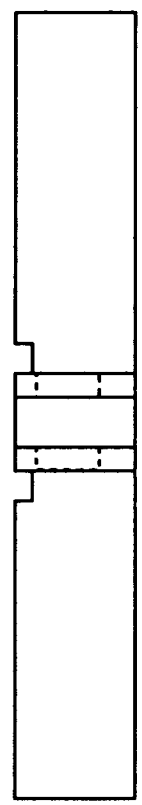
Figure 8:

FIGS. 6–8 show various views of a prior art forged chain link incorporating a metal flight which is welded to an inner end edge of a female end of a forged chain link. The extensive welding has been known to compromise integrity of the link and makes flight replacement extremely difficult.

Figure 9:
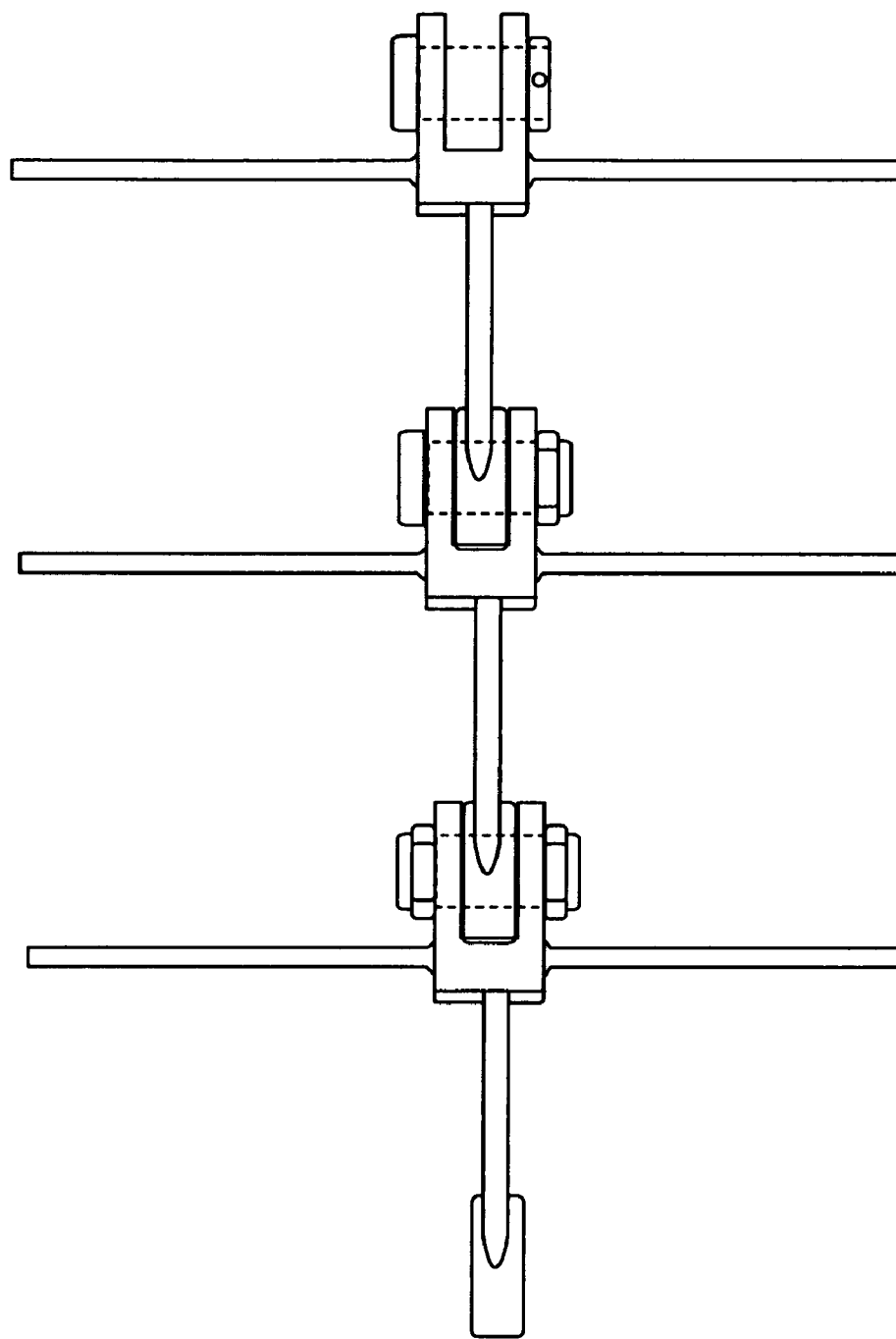
FIG. 9 shows a plurality of links shown in FIGS. 6–8 joined together using various styles of connector.

FIG. 9 shows a plurality of prior art forged chain links engaged together into a chain by a plurality of prior art connectors. It is these connectors which the herein presented embodiment(s) replace with structure which releasably engages flights to desired ones of various links without the need to weld the flights in place and without the need to drill any auxiliary holes into the body of the link or to weld studs thereto.

Figure 11:
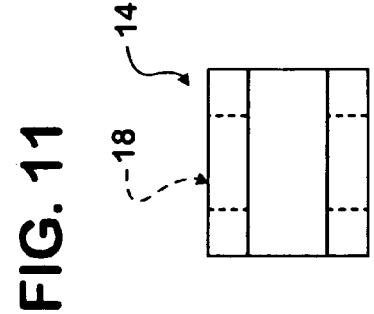
FIG. 11 shows a female end view of the link of FIG. 10.
Figure 10:
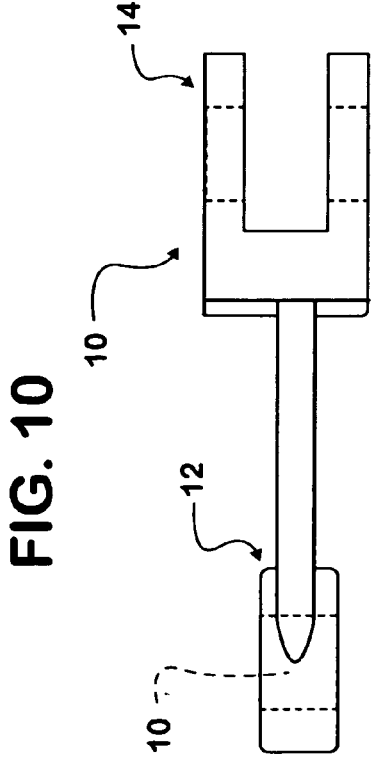
FIG. 10 shows a top plan view of a forged chain link showing same to have a male end and a female end.
Figure 12:
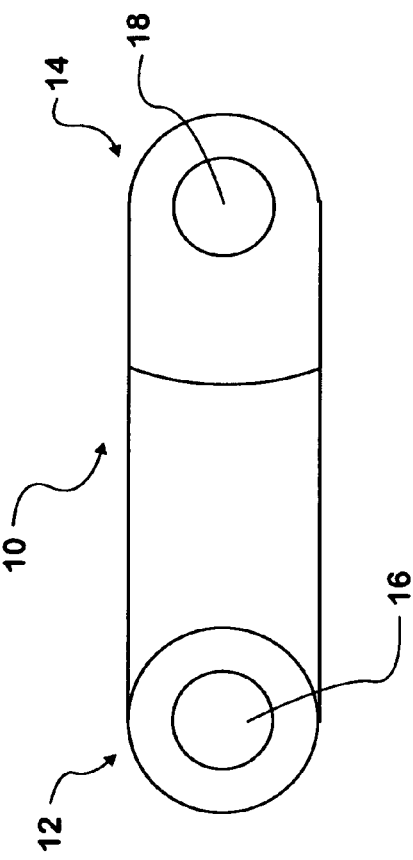
FIG. 12 shows a side view of the link of FIG. 10.

FIGS. 10–12 show various views of a forged chain link to which the present invention pertains. The link is generally identified by reference numeral 10 and is shown to have a male end 12 and a female end 14. The female end 14 of one link 10 pivotably engages a male end 12 of an adjacent link 10, with male end 12 incorporating a bore 16 and female end 14 having a cooperating throughbore 18 extending therethrough, by means of which, using a connector (not shown) links 10 are engaged together, pivotably, relative to each other, to form a chain.

Turning now to FIGS. 13–16, there is illustrated therein a forged chain link 10 having engaged thereto a pair of lateral plastic flights 20, in accordance with the method and structure of the present invention, to create the forged chain link and flight assembly 22 of the present invention.

In this embodiment the plastic flight 20 has a base 24 which is positioned to lie along each outer side surface 26 of the outer end 27 of the female end 14 of the link 10. Extending laterally away from the base 24, away from the link 10, is the body 26 of the flight 20. In the preferred embodiment, the body 26 thickens toward the base 24, taking the configuration of having a rearward, downward and outward slant relative to an outer end edge 28 of the base 24. This preferred configuration strengthens the body 26 of the flight 20, though this should not be construed as limiting.

The base 24 preferably includes a counter sunk bore 30 and surrounding area 32, with the body 26 of the flight 20 including a cooperating ovaled cutout 34 therein, extending into the base 24 for easing use of a tool for tightening of a bolt 36, as will be described in greater detail below, though this should not be construed as limiting.

Seated within the throughbore 18 in the female end 14 of the link 10, is a hollow sleeve or pin 38 which has a length slightly shorter than the distance between the outer side surfaces 26 of the female end 14. This slight shortening in the length of the sleeve 38 is to prevent binding of the sleeve 38 by the flights 20 when the flights 20 are tightened down against the outer side surfaces 26.

Once the sleeve 38 is positioned within the throughbore 18 in the female end 14 of one link 10 and through the aligned cooperating bore 16 in the male end 12 of an adjacent link 10, the flights 20 are positioned adjacent the outer side surfaces 26 of the female end 14 and one or more connectors 40 are used to secure the bases 24 of the lateral flights 20 against the link 10.

Figure 25:
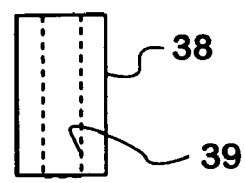
FIG. 25 shows a sleeve having a threaded interior hollow.
Figure 26:
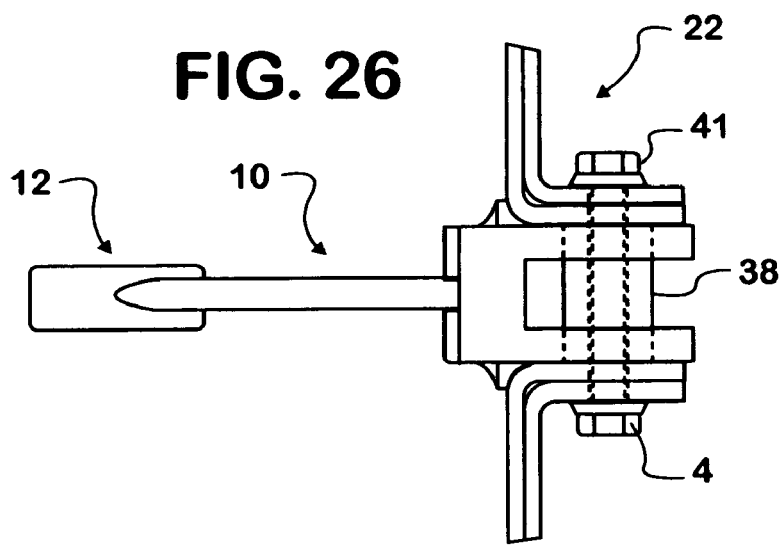
FIG. 26 shows the sleeve of FIG. 25 incorporated into the assembly and having two threaded bolts received therewithin with metal flights attached to each side of the link.
Figure 23:
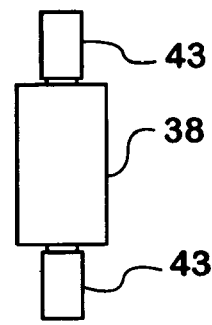
FIG. 23 shows a solid sleeve having threaded ends which can also be used to engage flights to a forged chain link.
Figure 24:
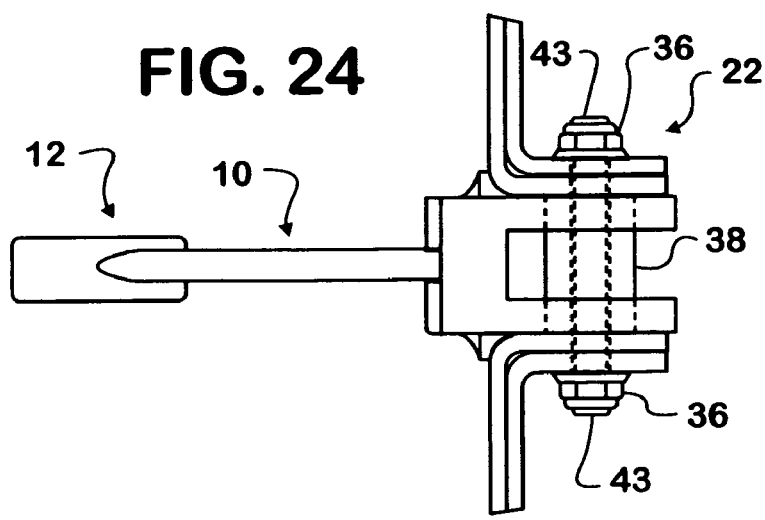
FIG. 24 shows the solid sleeve of FIG. 23 engaged within the female end of a forged chain link with metal flights attached to each side of the link.
Figure 27:
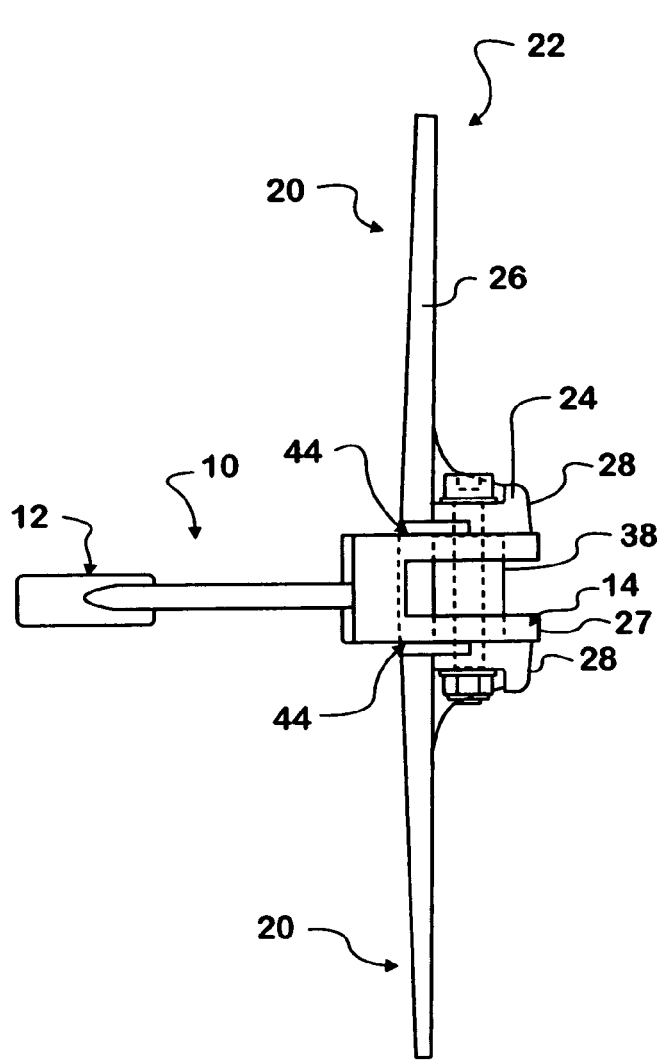
FIG. 27 is a bottom plan view of the assembly showing plastic flights thereof having a notch therein.
Figure 28:
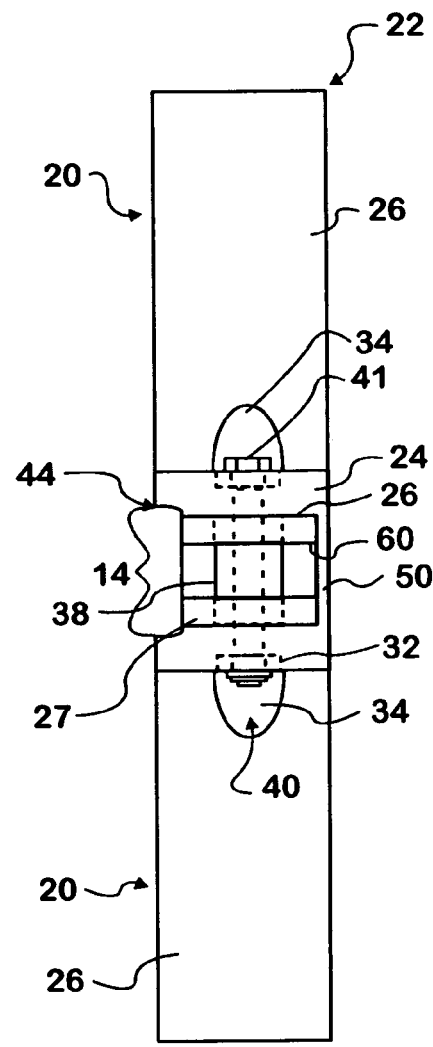
FIG. 28 is a female end view of the assembly of FIG. 27.
Figure 29:
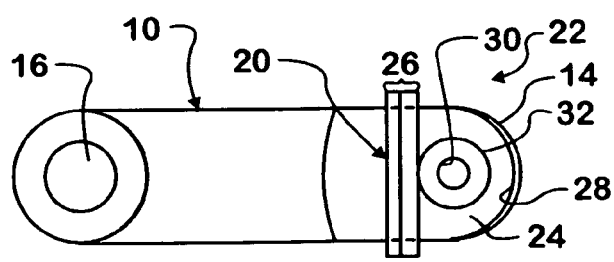
FIG. 29 is a side view of the assembly of FIG. 27.
Figure 32:
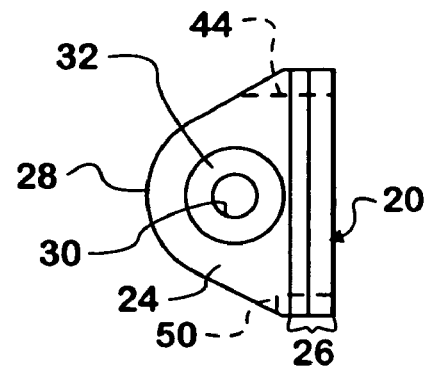
FIG. 32 is a side view of the flight of FIG. 30.
Figure 30:
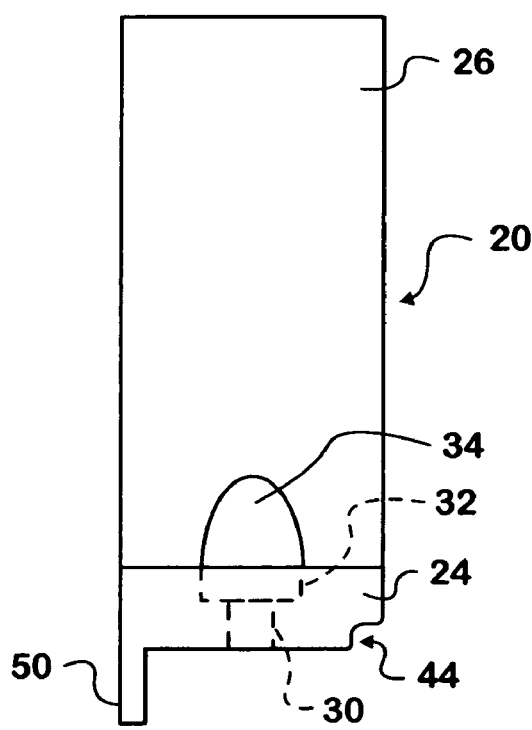
FIG. 30 is an end view of the plastic flight of FIGS. 27–29.
Figure 31:
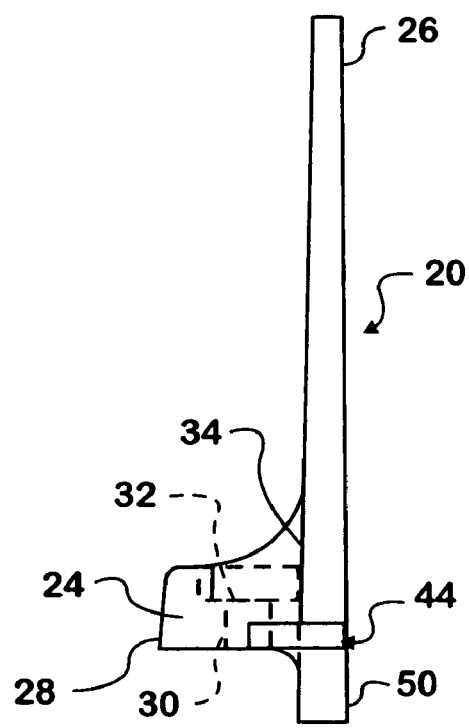
FIG. 31 is a bottom plan view of the plastic flight of FIG. 30.

In one embodiment, the connector 40 comprises an elongate bolt 41 and nut 36 combination 40, as shown in various ones of FIGS. 13–22. In another embodiment it has been proposed that an interior surface 39 of the hollow sleeve 38 can be threaded to receive a locking bolt 41 into each end thereof as shown in FIGS. 25 and 26, while in another embodiment, shown in FIGS. 23 and 24, it is proposed that a solid sleeve 38 with threaded ends 43 and locking nut 36 assembly 40 can be used as the connector 40. Thus, any form of suitable connector 40 which can accomplish the goal of engaging cooperating ends of adjacent links 10 and flights 20 together in a manner allowing the links 10 to pivot as required will be construed as suitable for use in the forged link chain and flight assembly 10, regardless of the type of flight 20 engaged thereto. It will now be understood that the cutout 34 in the body 26 of the flight 20 is provided to allow for introduction of a suitable tool (not shown) for fixing the flights 20 to the link 10 in a suitable manner.

Also it will be understood that the connector 40 does not require the provision of the counter sunk bore 30 in the base 24, which, however, is at present, the preferred embodiment, inasmuch as counter sinking of the bore 30 is not required.

Turning now to FIGS. 17–20, the assembly 22 is seen to incorporate the link 10, the hollow sleeve 38, a connector 40, and a pair of flights 20. However, in this embodiment the flights 20 are made of metal. One preferred metal, because it fairly inexpensive to use, is pressed steel, though this is not to be construed as limiting.

The metal flight 20 also incorporates a base 24 and a body 26, which in this embodiment, are both planar, the base 24 curving into the body 26. To add strength to the flight 20, an optional metal reinforcement 43 which nests within the curved portion and extends along the base 24 and a portion of the body 26 may be provided. Engagement of the metal flight 20 to the link 10 here is made in a manner identical to that described above, with the connector 40 passing through the flight 20 and metal reinforcement 43, if present.

It will be seen that these metal flights 20, incorporate a notch 44 therein, adjacent the base 24. This notch 44 is provided in both metal and plastic flights 20 when centered guide rails (not shown) are present in the conveying (not shown) mechanism with which the assemblies 22 are used.

Figure 21:
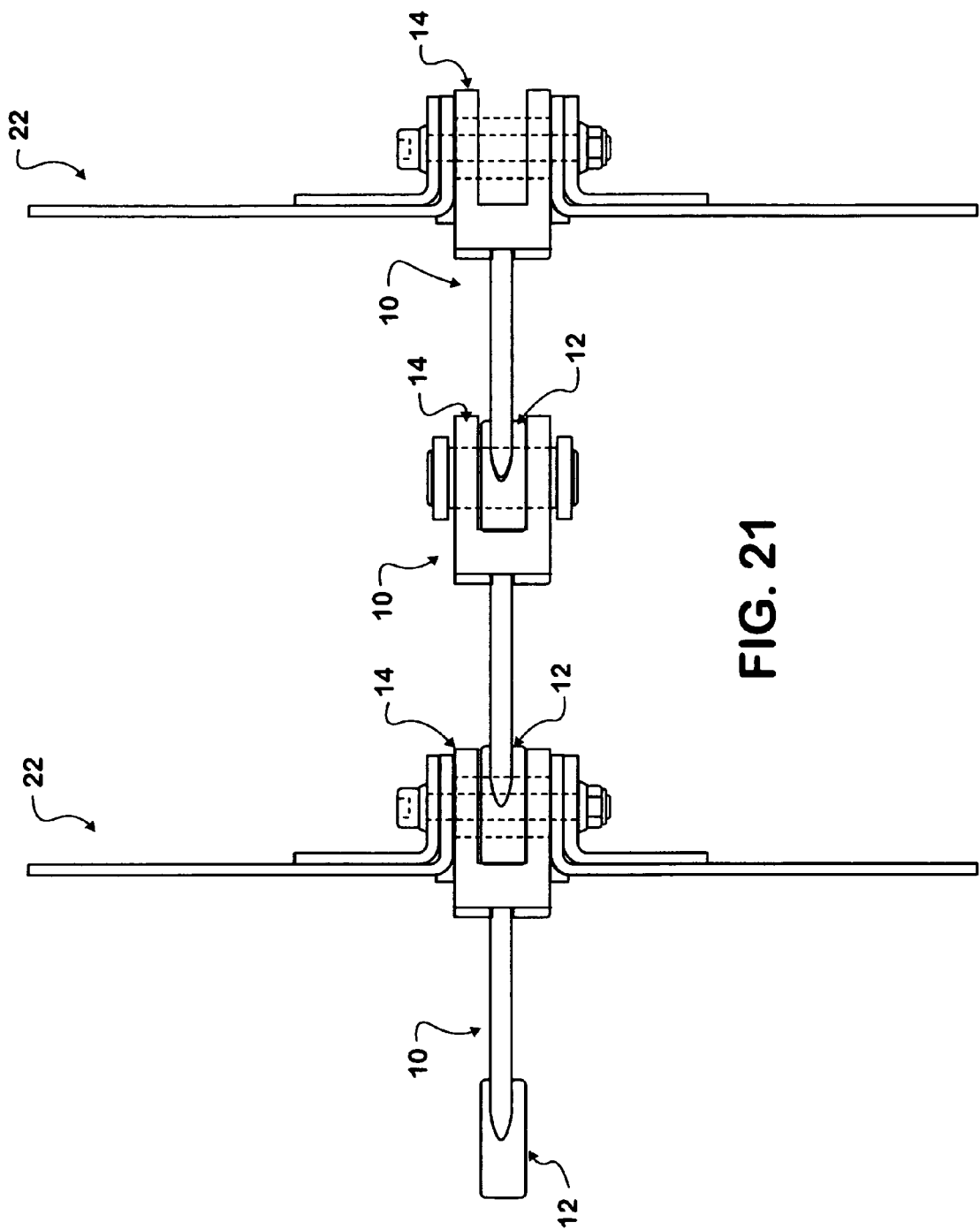
FIG. 21 shows a plurality of chain links of the assembly having a varied array of metal flights associated with various links.
Figure 22:
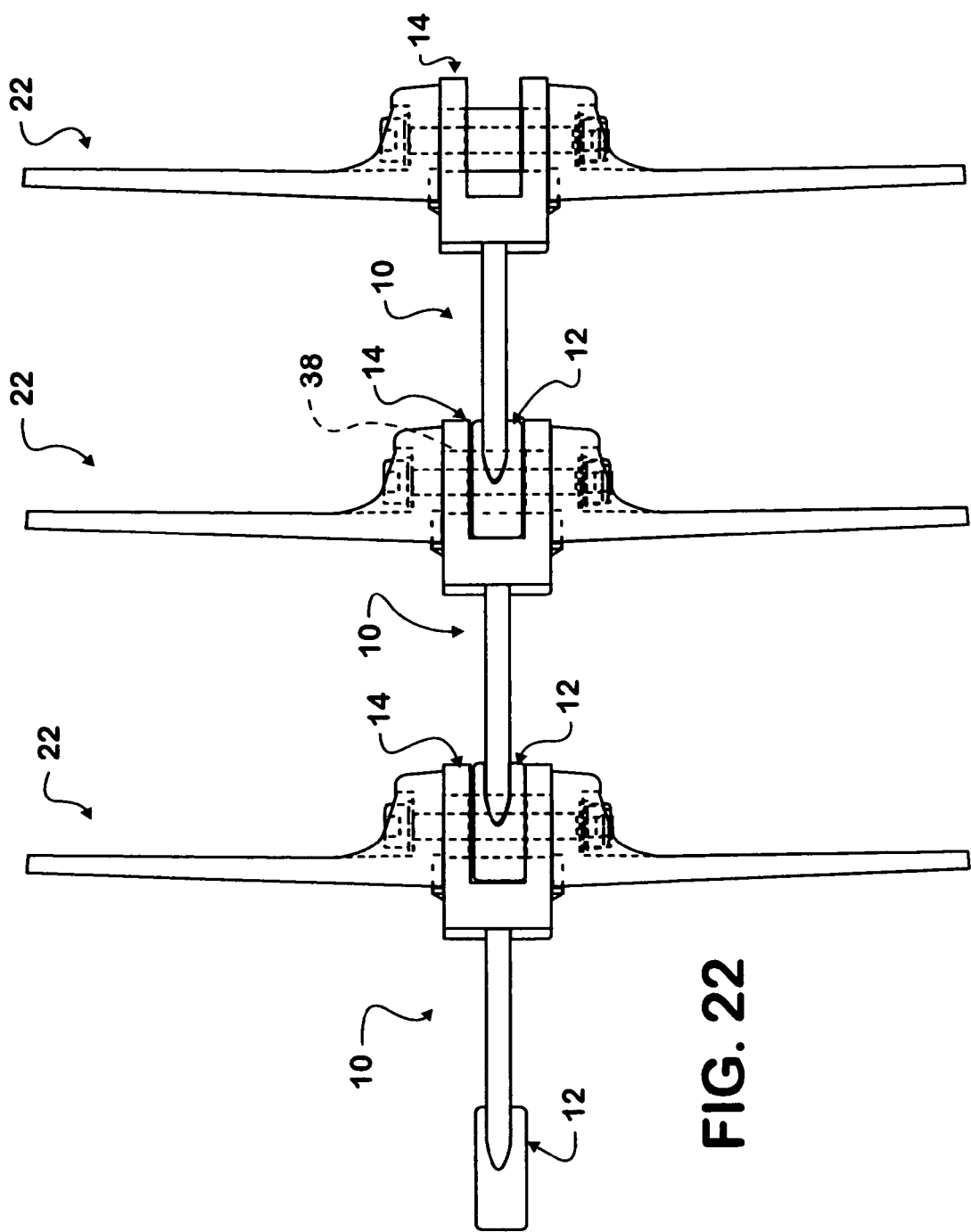
FIG. 22 shows a plurality of chain links of the assembly having a varied array of plastic flights associated with various links.

In FIG. 21, the link and flight assemblies 22 are shown to be provided on alternating chain links 10, while in FIG. 22, the link and flight assemblies 22 are shown to replace every chain link 10. Thus, the patterning of assemblies 22 is seen to be variable, as desired or required.

Turning back to FIGS. 13 and 15, it will be seen that, if desired or necessary, an optional antirotation device 50 can also be incorporated into each assembly 22.

In a preferred embodiment, as shown, the antirotation or positioning device 50 comprised a positioning pin, lug or nub 52 suitably attached to the outer side surface 26 of the female end 14, which cooperates with a slot 54 formed in the base 24 of the flight 20, such that, when the flight 20 is tightened onto the female end 14 of the link 10, the slot 54 engages or seats upon the pin 52, to keep the flight 20 from twisting out of position relative to the link 10.

The pin 52 is, in the illustrated embodiment, centered across a width of the outer side wall 26, and is engaged to the link 10 by a spot weld 60, though this should not be construed as a limiting configuration for the optional positioning device 50.

Thus, the assembly 22 is seen to be is seen to be one which allows for ease in replacement of damaged or worn flights 20 without need of welding or extraneous holes in the link 10, and lends itself nicely to being capable of being retrofit.

Referring now to FIGS. 27–31, it will be seen that the Figures show a further embodiment of the assembly 22 including a notched embodiment of a plastic flight 20. It will be appreciated that the notch 44 in this embodiment is differently configured than the notch 44 previously illustrated in relation to the notched metal flight shown in FIGS. 17–19.

It will be understood that the configuration of the notch 44 in any embodiment of a flight 20 can be configured to accommodate any of the various embodiments of guide rails known to those skilled in the art. Thus the assemblies 22 of the present invention and method of making same provide assemblies 22 which can be considered universal, and is adaptable to being retrofit in virtually every environment.

Also, in this embodiment, the positioning device 50 is shown to comprise a tab 50 which extends from the base 24 of the flight 20, and in the illustrated embodiment, rests against and extends along an outer (top) surface 60 of the female end 14 of a link 10 to which it is engaged. The tab 50 is at position on the flight 20 opposite to that at which the notch 44 is located, so, again, as not to interfere if guide rails need to be accommodated for.

The tab 50 resting against the surface 60 of the female end 14 of the flight 20 will maintain position of the flight 20 relative to the link 10, as accomplished by the alternate embodiment of the positioning device 50 of the previous Figures.

It will be understood that all embodiments of the assembly 22 are merely exemplary and should not be construed as set in stone, or limiting to the inventions disclosed herein.

As described above the assembly 22 of the present invention, in combination with the method of creating the assembly 22, provides a number of advantages, some of which have been described above and others of which are inherent in the invention. Also, modifications to the assembly 22 and method of creating same can be proposed without departing from the teachings herein. As an example, two bolts, rather than a throughbolt could be used in engaging flights 20 to the link 10. Accordingly, the scope of the invention is only to be limited as necessitated by the accompanying claims.

I claim:

1. A forged chain link and flight assembly comprising a forged chain link having a male end and a female end which cooperates with an opposite end of an adjacent link to form a chain, each end having a throughbore therein which cooperates with a throughbore in the opposite end of an adjacent link to form a bore for receiving a connector therein for creating a forged link chain wherein the links pivot relative to each other, the improvement comprising; the connector being configured in the form of a hollow sleeve extending through substantially an entire length of the bore, a separate flight which is tightenable against each lateral side of the female end of a chain link with a nut and elongate bolt, the elongate bolt extending through a bore in each flight and the hollow sleeve which joins the links together.

2. The assembly of claim 1 wherein the flight includes a base having said bore therein and a body portion which extends laterally away from the base and the link.

3. The assembly of claim 2 wherein the flight is plastic.

4. The assembly of claim 2 wherein the flight is metal.

5. The assembly of claim 2 wherein a reinforcement is nested within a curved area between the base and the body of the flight.

6. The assembly of claim 5 wherein the reinforcement has a bore therein which aligns with the bore in the base of the flight.

7. The assembly of claim 6 wherein said bolt extends through the base of a reinforcement and flight and the hollow sleeve therebetween, the bolt receiving said nut on one end thereof, said nut being a locking nut.

8. The assembly of claim 1 including a positioning device for keeping each flight in appropriate position relative to the link.

9. The assembly of claim 8 wherein the positioning device comprises a pin fixed to a lateral surface of the female end of the link, the pin engaging within a slot provided in the base of the flight.

10. A method for producing a forged chain link and flight assembly comprising a forged chain link having a male end and a female end which cooperates with an opposite end of an adjacent link to form a chain, each end having a throughbore therein which cooperates with a throughbore in the opposite end of an adjacent link to form a bore for receiving a connector therein for creating a forged link chain wherein the links pivot relative to each other, the improvement comprising engaging a flight to each lateral side of the female end of a chain link using a nut and elongate bolt which extend through the connector which joins the links together, the method including the steps of:

engaging a male end of a link with a female end of an adjacent link;

placing a connector into aligned bores of the engaged link ends;

positioning a flight over each lateral side of the female end of the link;

and tightening down the flights against the engaged links using a nut and elongate bolt, the elongate bolt extending through a bore in each flight and the connector.

11. The method of claim 10 further including aligning a slot in each flight over an alignment pin if such is provided on the link.

12. The method of claim 10 wherein a strengthening device for a flight is also engaged to the links by the nut and elongate bolt.

13. A forged chain link and flight assembly comprising a forged chain link having a male end and a female end which cooperates with an opposite end of an adjacent link to form a chain, each end having a throughbore therein which cooperates with a throughbore in the opposite end of an adjacent link to form a bore for receiving a connector therein for creating a forged link chain wherein the links pivot relative to each other, the improvement comprising engaging a separate flight to each lateral side of the female end of a chain link using the connector which joins the links together, the connector comprising a hollow sleeve which seats within the bore and has a threaded interior and receives a bolt into each end thereof, the bolt passing through a respective flight to one side of the female end and extending into the sleeve.

* * * * *